US008443210B2

(12) United States Patent
Bandholz et al.

(10) Patent No.: US 8,443,210 B2
(45) Date of Patent: May 14, 2013

(54) POWER MANAGEMENT MODULE ENFORCING COMPUTER POWER CAPPING BY READING POWER CAP INFORMATION FROM NAMEPLATE HAVING BOTH MACHINE READABLE MODULE AND HUMAN READABLE DESIGNATION FOR PROVIDING SUCH INFORMATION

(75) Inventors: Justin P. Bandholz, Cary, NC (US); Thomas M. Brey, Cary, NC (US); Nickolas J. Gruendler, Pflugerville, TX (US); William G. Pagan, Durham, NC (US); William J. Piazza, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 657 days.

(21) Appl. No.: 12/561,591

(22) Filed: Sep. 17, 2009

(65) Prior Publication Data

US 2011/0066865 A1 Mar. 17, 2011

(51) Int. Cl.
*G06F 1/00* (2006.01)
*G08B 13/14* (2006.01)
*H04Q 5/22* (2006.01)
*G05D 3/12* (2006.01)

(52) U.S. Cl.
USPC ..................... 713/300; 340/572.7; 340/572.1; 340/10.1; 340/10.33; 700/291; 705/412

(58) Field of Classification Search .................. 713/300, 713/322; 710/62; 340/572.1, 10.1, 691.1, 340/572.7, 10.33; 705/412; 700/291
See application file for complete search history.

(56) References Cited

U.S. PATENT DOCUMENTS 6,427,176 B1 7/2002 Berglund et al.
6,677,852 B1 * 1/2004 Landt ........................... 340/10.1
6,778,096 B1 8/2004 Ward et al.
6,987,454 B2 * 1/2006 Narayanaswami et al. .......................... 340/572.1
7,274,297 B2 * 9/2007 Kodukula et al. .......... 340/572.7
7,307,529 B2 12/2007 Gutnik et al.
7,353,415 B2 4/2008 Zaretsky et al.
7,366,806 B2 4/2008 Milenkovic et al.
7,400,252 B2 * 7/2008 Larson et al. .............. 340/572.1
7,418,608 B2 8/2008 Kumar et al.
2003/0225713 A1 * 12/2003 Atkinson et al. .............. 705/412
2004/0113789 A1 * 6/2004 Zukowski et al. ......... 340/572.1
2005/0283624 A1 * 12/2005 Kumar et al. ................ 713/300
2006/0022802 A1 * 2/2006 Bridgelall .................. 340/10.33
2006/0026316 A1 * 2/2006 Milenkovic et al. ............ 710/62
2007/0070566 A1 3/2007 Campini et al.
2007/0285238 A1 * 12/2007 Batra ......................... 340/572.1

(Continued)

FOREIGN PATENT DOCUMENTS

WO WO 03/079295 A2 9/2003

*Primary Examiner* — Thomas Lee
*Assistant Examiner* — Aurel Prifti
(74) *Attorney, Agent, or Firm* — H. Barrett Spraggins; Thomas E. Tyson; Biggers & Ohanian, LLP

(57) ABSTRACT

A nameplate for power capping a computer including a mounting surface; a module integrated in the mounting surface for providing a machine-readable designation of a power cap for a particular computer; a human readable designation of a power cap for the particular computer integrated in the mounting surface; and a mount for attaching the mounting surface to a chassis of the particular computer such that the human readable designation of a power cap is exposed.

19 Claims, 7 Drawing Sheets

U.S. PATENT DOCUMENTS

| | | | | |
|---|---|---|---|---|
| 2007/0300083 | A1* | 12/2007 | Goodrum et al. | 713/300 |
| 2008/0100423 | A1* | 5/2008 | Geissler et al. | 340/10.1 |
| 2008/0157924 | A1* | 7/2008 | Batra | 340/10.1 |
| 2008/0249666 | A1 | 10/2008 | Buterbaugh et al. | |
| 2009/0119523 | A1* | 5/2009 | Totten | 713/322 |
| 2010/0060428 | A1* | 3/2010 | Lee et al. | 340/10.1 |
| 2010/0210135 | A1* | 8/2010 | German et al. | 439/491 |
| 2010/0217449 | A1* | 8/2010 | Musti et al. | 700/291 |
| 2010/0231407 | A1* | 9/2010 | Carr | 340/691.1 |
| 2010/0315203 | A1* | 12/2010 | Peden et al. | 340/10.1 |
| 2011/0156907 | A1* | 6/2011 | Nagai | 340/572.1 |

* cited by examiner

POWER MANAGEMENT MODULE ENFORCING COMPUTER POWER CAPPING BY READING POWER CAP INFORMATION FROM NAMEPLATE HAVING BOTH MACHINE READABLE MODULE AND HUMAN READABLE DESIGNATION FOR PROVIDING SUCH INFORMATION

BACKGROUND OF THE INVENTION

1. Field of the Invention

The field of the invention is data processing, or, more specifically, methods, apparatus, and products for nameplate power capping.

2. Description of Related Art

A common concern in datacenters is that the power requirement for a system as stated on the equipment nameplate, also called the nameplate rating, is much higher than the actual power consumption that the system will actually ever use. This is because the nameplate rating provides a value of power consumption for the system if the system has all of its available resources consuming maximum power. That is, the nameplate rating is a worst case or maximum value of power consumption that the system is capable of, even often considering future upgrades to the system. However the actual usage of the system may not populate all sockets, slots, and bays of the computer, may use low power consuming options, and may never be upgraded. An operator of a datacenter typically uses the nameplate rating when making a power budget for the datacenter and an electrical inspector typically uses the nameplate rating to determine whether the datacenter is complying with electrical codes.

SUMMARY OF THE INVENTION

A nameplate for power capping a computer including a mounting surface; a module integrated in the mounting surface for providing a machine-readable designation of a power cap for a particular computer; a human readable designation of a power cap for the particular computer integrated in the mounting surface; and a mount for attaching the mounting surface to a chassis of the particular computer such that the human readable designation of a power cap is exposed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
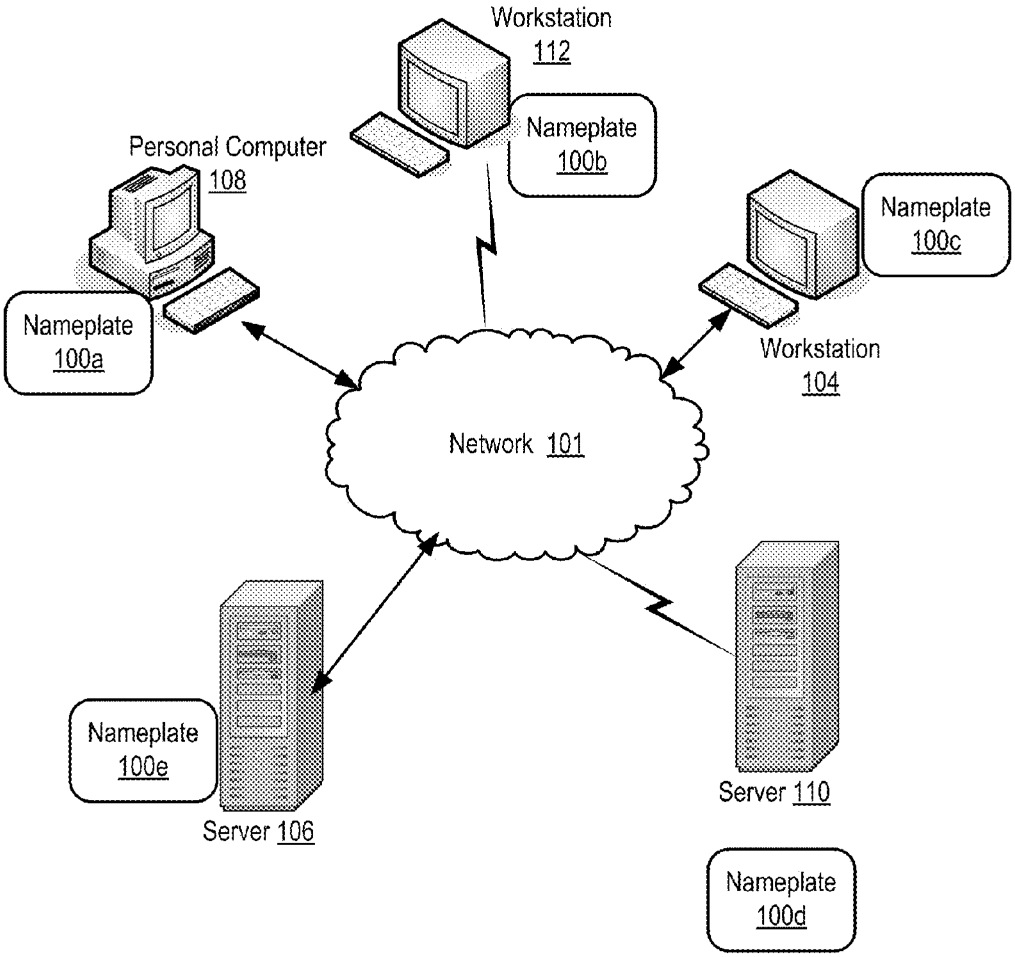
FIG. 1 sets forth a network diagram of a system of computers capable of nameplate power capping according to embodiments of the present invention.

Exemplary methods, nameplates, and computer program products for nameplate power capping in accordance with the present invention are described with reference to the accompanying drawings, beginning with FIG. 1. FIG. 1 sets forth a network diagram of a system of computers (108, 112, 104, 110, 106) capable of being power capped according to embodiments of the present invention. The system of FIG. 1 includes a personal computer (108), a workstation (112), another workstation (104), a server (110), and another server (106) coupled to one another for data communications through a network (101).

Each of the computers (108, 112, 104, 110, 106) has mounted upon it a nameplate (100*a*-100*e*) for power capping according to the present invention. A nameplate is attached to a computer and provides information about the computer such as the manufacturer of the computer, the nameplate power rating of the computer, components within the computer, date of manufacture of the computer, and other information as will occur to those of skill in the art. The nameplates (100*a*-100*e*) of FIG. 1 each include a mounting surface for securing the nameplate to the computer, a module integrated in the mounting surface for providing a machine-readable designation of a power cap for the particular computer to which it is attached; and a human readable designation of a power cap for the particular computer integrated in the mounting surface; and a mount for attaching the mounting surface to a chassis of the particular computer such that the human readable designation of a power cap is exposed. The name plates of FIG. 1 advantageously provide to a datacenter operator, an electrical inspector, or other user the power consumption value at which the particular computer having the attached nameplate is capped and also provides to the computer upon which the nameplate is attached a machine readable designation of the power cap. That is, the nameplate both informs users of the power cap and also enforces that power cap. Such a nameplate allows power budgeting using an evaluation of power consumption based upon the actual power capped value rather than a nameplate rating which may not accurately reflect the actual power consumption of the computer. In some embodiments, the nameplate may also include a human readable designation of the traditional nameplate rating.

Each of the computers of FIG. 1 is capable of nameplate power capping according to embodiments of the present invention. Nameplate power capping according to some embodiments of the present invention includes providing, by a nameplate (100*a*-100*e*) for the computer (108, 112, 104, 110, 106), a machine-readable designation of the power cap for the computer; reading, by a power management module of the computer (108, 112, 104, 110, 106) from the nameplate (100*a*-1003), the designation of the power cap; and enforcing, by the power management module, the power cap on the computer.

The arrangement of computers and other devices making up the exemplary system illustrated in FIG. 1 are for explanation, not for limitation. Data processing systems useful according to various embodiments of the present invention may include additional servers, routers, rack mounted equipment, blade architectures, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Nameplate power capping in accordance with the present invention is generally implemented with computers, that is, with automated computing machinery. For further explanation, therefore, FIG. 2 sets forth a block diagram of automated computing machinery comprising an exemplary computer (152) useful in nameplate power capping according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a power management module (220), a module of computer program instructions for reading, from the nameplate (100), the machine readable designation of the power cap and enforcing the power cap on the computer. Such a power management module is capable of capping the power consumption of the computer (152) at the power consumption value designated by the nameplate (100).

Figure 2:
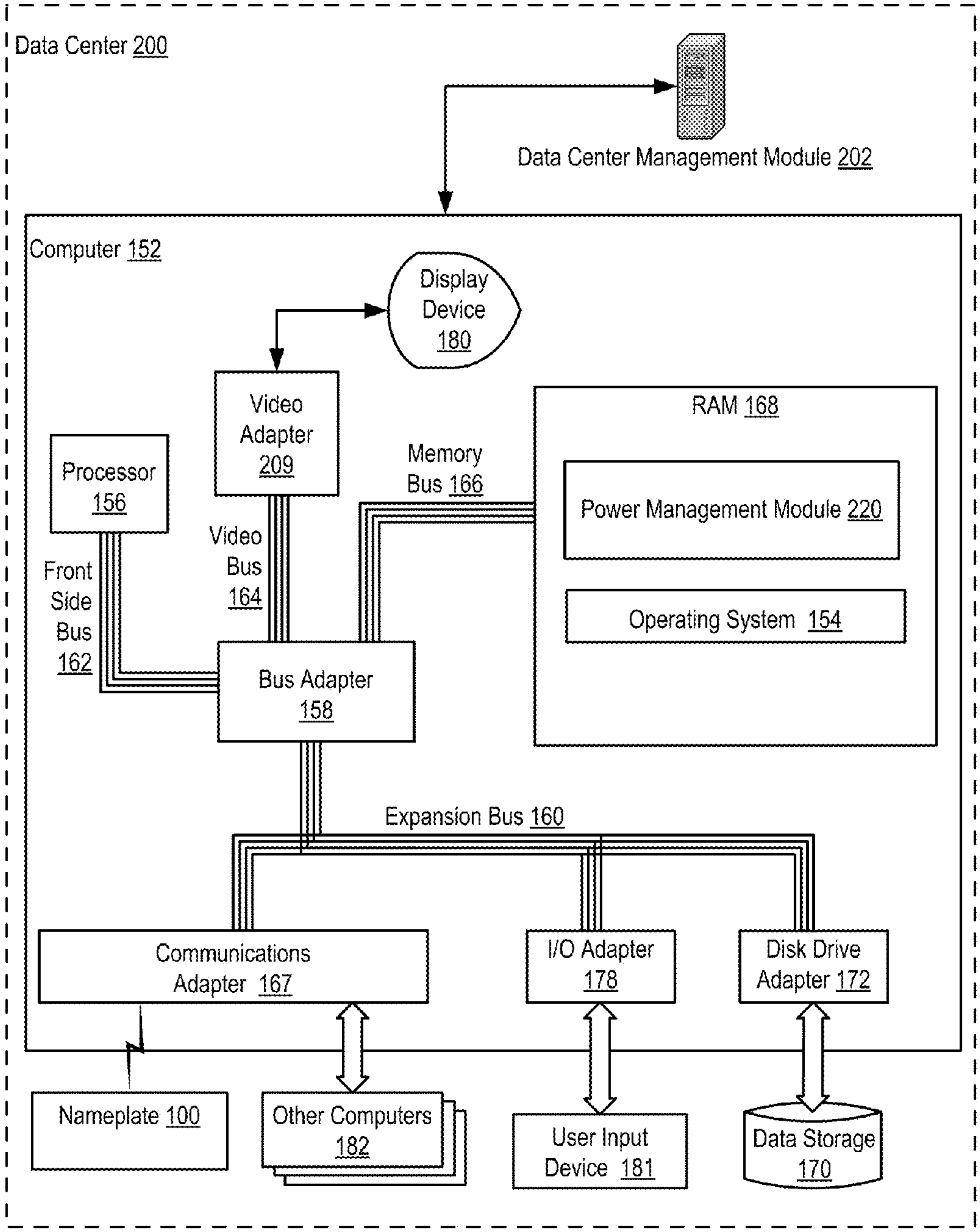
FIG. 2 sets forth a block diagram of automated computing machinery comprising an exemplary computer useful in nameplate power capping according to embodiments of the present invention.

The power management module (200) is illustrated in the example of FIG. 2 in RAM. The is for explanation and not for limitation. Alternatively, the power management module (200) may be implemented within a microcontroller mounted on a main system board independent of the main processor and operating system, such as a baseboard management controller, implemented in a service processor such as a Remote Service Adapter or BladeCenter Management Module, or in other ways as will occur to those of skill in the art.

Also stored in RAM (168) is an operating system (154). Operating systems useful nameplate power capping according to embodiments of the present invention include UNIX™ Linux™ Microsoft XP™, AIX™ IBM's i5/OS™, and others as will occur to those of skill in the art. The operating system (154), power management module (200) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for nameplate power capping according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for nameplate power capping according to embodiments of the present invention include modems for wired dial-up communications, Ethernet (IEEE 802.3) adapters for wired data communications network communications, and 802.11 adapters for wireless data communications network communications.

The exemplary computer (152) has attached to it a nameplate (100) for nameplate power capping according to embodiments of the present invention. The nameplate (100) of FIG. 1 is capable of providing, to the computer (152) upon which it is attached, a machine-readable designation of the power cap for the computer The nameplate of FIG. 2 includes a mounting surface to be mounted to the computer (152); a module integrated in the mounting surface for providing a machine-readable designation of a power cap for a particular computer; a human readable designation of a power cap for the particular computer integrated in the mounting surface; and a mount for attaching the mounting surface to the chassis of the computer (152) such that the human readable designation of a power cap is exposed. The nameplate (100) of FIG. 2 allows a user to read the power cap such that the user may use that power cap in a number of useful ways such as to determine a power budget for a datacenter or other computer power budget, use the power budget in an inspection of a datacenter or in other ways as will occur to those of skill in the art.

The computer (152) of FIG. 2 resides in a data center. A data center is a facility used to house computer systems and associated components, such as telecommunications and storage systems. The exemplary data center (200) of FIG. 2 also includes a data center management module, a module of automated computing machinery capable of reading from the nameplate, the designation of the power cap and using the power cap in a power budget for the data center.

Figure 3:
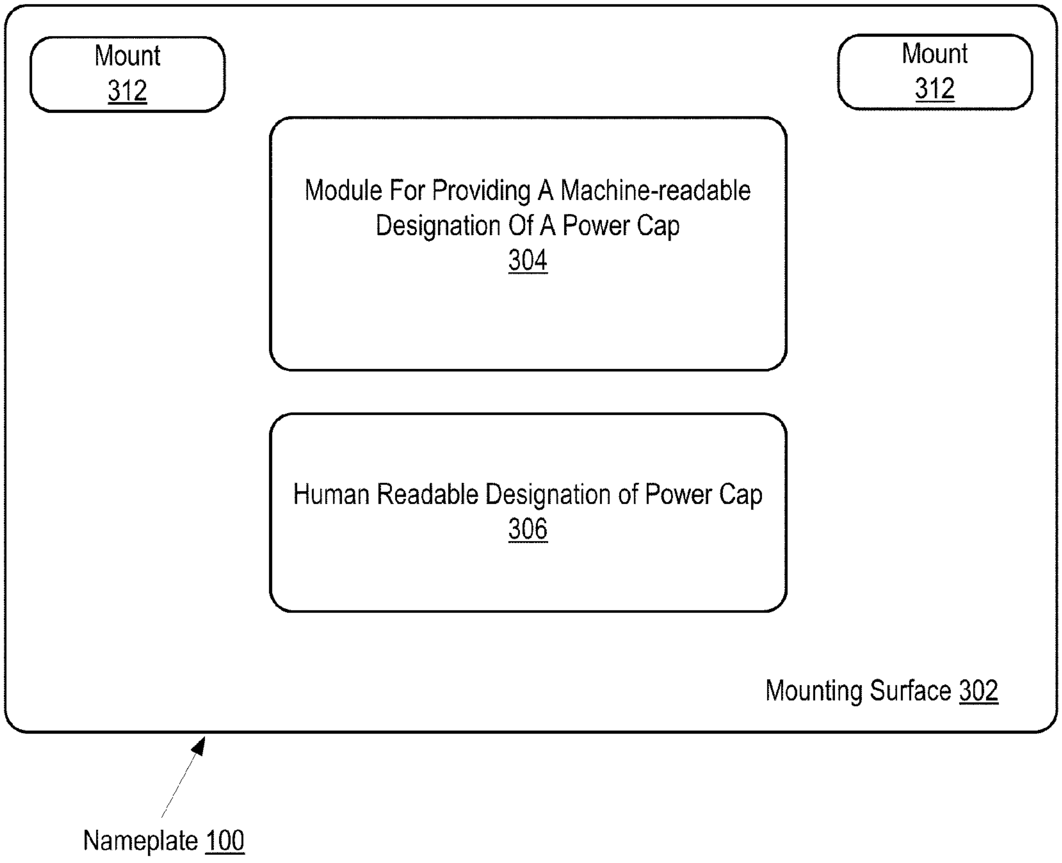
FIG. 3 sets forth a block diagram illustrating an exemplary nameplate for power capping a computer according to embodiments of the present invention.

For further explanation, FIG. 3 sets forth a block diagram illustrating an exemplary nameplate (100) for power capping a computer according to embodiments of the present invention. The nameplate (100) of FIG. 3 includes a mounting surface (302). The mounting surface provides a surface to secure to a computer and also a surface to display a human readable designation of the power cap.

The nameplate (100) of FIG. 3 includes a module (304) integrated in the mounting surface (302) for providing a machine-readable designation of a power cap for a particular computer. The module (304) may provide a machine-readable designation of a power cap for a particular computer through a wireless interface with the computer upon which it is mounted and may store in memory integrated in the nameplate a value of a power cap for the particular computer. The module (304) may be implemented as a radio-frequency identification (RFID) tag, a bar code, or other module for providing a machine-readable designation of a power cap for a particular computer that will occur to those of skill in the art.

The nameplate (100) of FIG. 3 also includes a human readable designation (306) of a power cap for the particular computer integrated in the mounting surface (302). The human readable designation of a power cap for the particular computer may be printed on the mounting surface, engraved in the mounting surface, or any other way of integrating the human readable designation of the power cap in the mounting surface that will occur to those of skill in the art.

The nameplate (of) FIG. 3 also includes a mount (312) for attaching the mounting surface (302) to a chassis of the particular computer such that the human readable designation of a power cap is exposed. In the example of FIG. 3, the mount is implemented as two cavities in the mounting surface for accepting screws to secure the coming surface to the computer. In alternative embodiments of the present invention, the mount may be implemented as adhesive, one or more rivets, or any other suitable mount that will occur to those of skill in the art.

Figure 4:
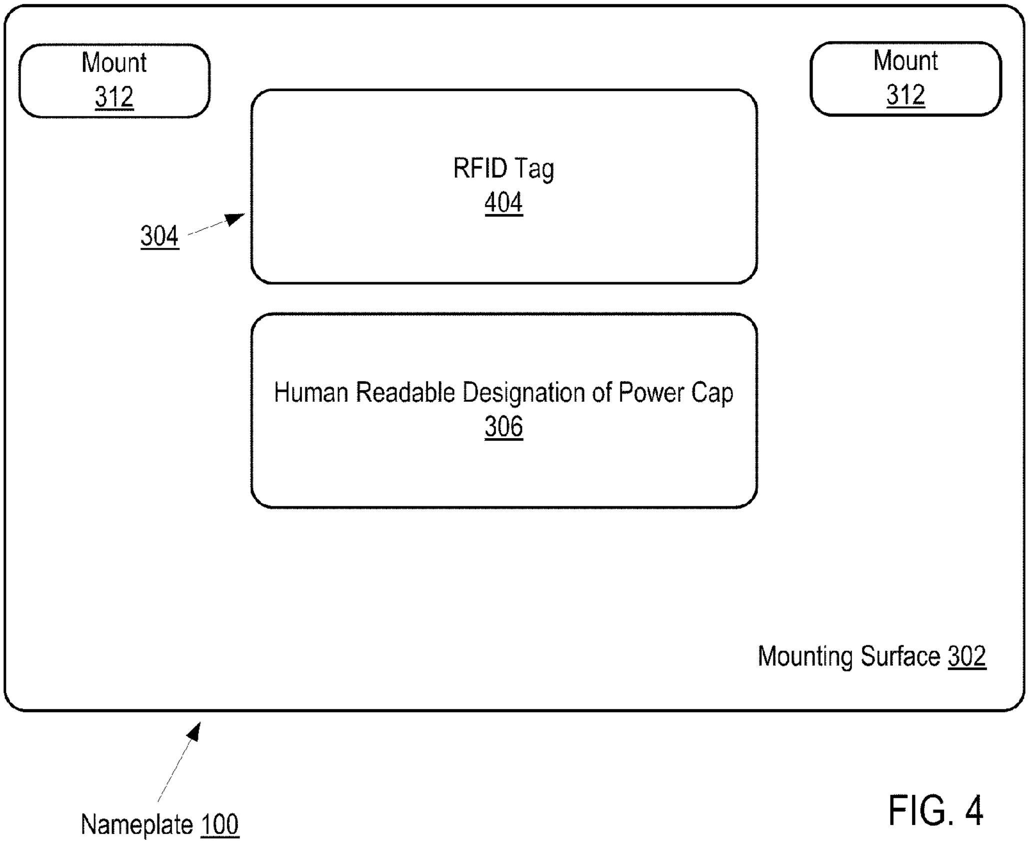
FIG. 4 sets forth a block diagram illustrating an exemplary nameplate for power capping a computer according to embodiments of the present invention.

For further explanation, FIG. 4 sets forth a block diagram illustrating an exemplary nameplate (100) for power capping a computer according to embodiments of the present invention. The nameplate (100) of FIG. 4 is similar to the nameplate of FIG. 3 in that the nameplate (100) of FIG. 4 includes a mounting surface (302); a module (304) integrated in the mounting surface (302) for providing a machine-readable designation of a power cap for a particular computer; a human readable designation (306) of a power cap for the particular computer integrated in the mounting surface (302); and a mount (312) for attaching the mounting surface (302) to a chassis of the particular computer such that the human readable designation of a power cap is exposed. In the example of FIG. 4, the module (304) integrated in the mounting surface comprises an RFID tag (404). Most RFID tags contain an integrated circuit for storing and processing information, modulating and demodulating a radio-frequency (RF) signal, and other specialized functions. Most RFID tags also typically include an antenna for receiving and transmitting a signal to and from an RFID reader. There are generally three types of RFID tags: active RFID tags, which contain a battery and can transmit signals autonomously, passive RFID tags, which have no battery and require an external source to provoke signal transmission and battery assisted passive (BAP) RFID tags which require an external source to wake up but have significant higher forward link capability providing great read range. In the example of FIG. 4 a computer upon which the nameplate (100) is attached may include an integrated RFID reader capable of reading from the RFID tag the designation of the power cap for the computer.

Figure 5:
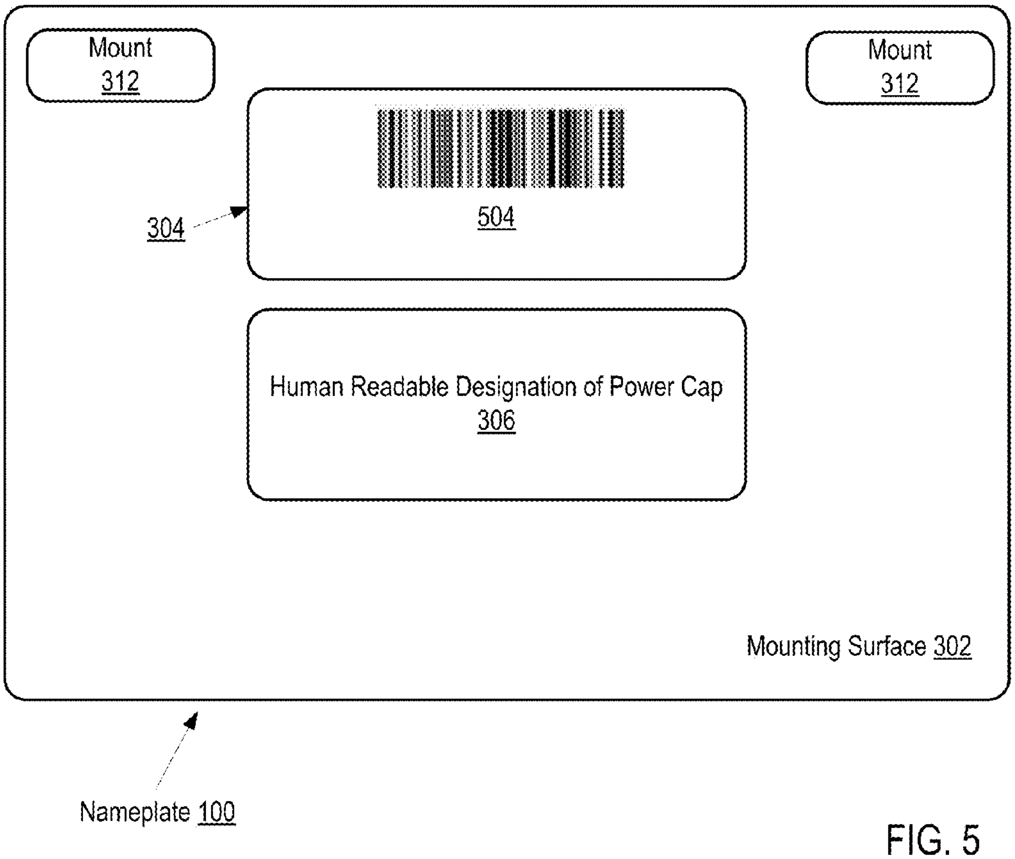
FIG. 5 sets forth a block diagram illustrating an exemplary nameplate for power capping a computer according to embodiments of the present invention.

For further explanation, FIG. 5 sets forth a block diagram illustrating an exemplary nameplate (100) for power capping a computer according to embodiments of the present invention. The nameplate (100) of FIG. 5 is similar to the nameplate of FIG. 3 in that the nameplate (100) of FIG. 5 includes a mounting surface (302); a module (304) integrated in the mounting surface (302) for providing a machine-readable designation of a power cap for a particular computer; a human readable designation (306) of a power cap for the particular computer integrated in the mounting surface (302); and a mount (312) for attaching the mounting surface (302) to a chassis of the particular computer such that the human readable designation of a power cap is exposed. In the nameplate (100) of FIG. 5 the module (304) integrated in the mounting surface comprises a bar code (504). A bar code is an optical machine-readable representation of data. Bar codes useful in nameplate power capping according to embodiments of the present invention may be represent data in the widths of lines and spacing between lines. Such bar codes may be referred to as linear or 1D bar codes. Bar codes useful in nameplate power capping according to the present invention may also use patterns of squares, dots, hexagons and other geometric patterns within images. Such bar codes are typically called 2D matrix codes. Although 2D bar codes use symbols other than bars, they are generally referred to as bar codes as well.

Figure 6:
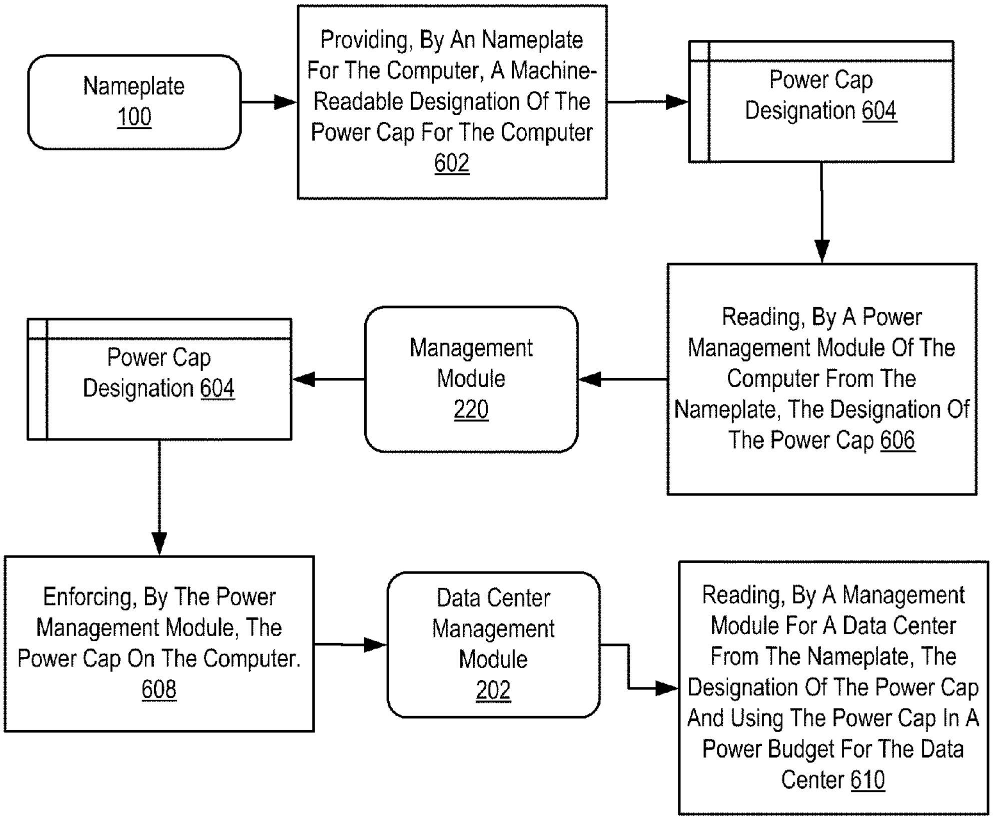
FIG. 6 sets forth a flow chart illustrating an exemplary method of nameplate power capping according to the present invention.

For further explanation, FIG. 6 sets forth a flow chart illustrating an exemplary method of nameplate power capping according to the present invention. The method of FIG. 6 includes providing (602), by a nameplate (100) for the computer, a machine-readable designation (604) of the power cap for the computer. Providing (602), by a nameplate (100) for the computer, a machine-readable designation (604) of the power cap may be carried out by providing in an RFID tag a designation of the power cap, providing in a bar code a designation of the power cap, providing through wireless data communications with the computer a value of the power cap stored in memory in the name plate or any other way of providing by the nameplate (100) for the computer, a machine-readable designation (604) of the power cap for the computer that will occur to those of skill in the art.

The method of FIG. 6 includes reading (606), by a power management module (220) of the computer from the nameplate (100), the designation (604) of the power cap. Reading (606), by a power management module (220) of the computer from the nameplate (100), the designation (604) of the power cap may include reading a designation of a power cap with an RFID reader from an RFID tag integrated in the nameplate, reading a designation of a power cap with a bar code reader from a bar code integrated in the nameplate, reading through wireless data communications with the nameplate a value of the power cap stored in memory in the name plate or any other way of reading (606), by a power management module (220) of the computer from the nameplate (100), the designation (604) of the power cap. A power management module is a module of automated computing machinery for managing the power consumption of the computer.

The method of FIG. 6 includes enforcing (608), by the power management module (220), the power cap on the computer. Enforcing (608), by the power management module (220), the power cap on the computer is carried out by establishing for the operations of the computer a threshold of power consumption that the computer has no permission to exceed. Enforcing (608) the power cap on the computer may include, for example, reducing processor clock frequencies, reducing processor voltage levels, removing power from unnecessary circuitry, and in other ways as will occur to those of skill in the art.

The method of FIG. 6 also includes reading (610), by a management module (202) for a data center from the nameplate (100), the designation of (604) the power cap and using the power cap in a power budget for the data center. Reading (610), by a management module (202) for a data center from the nameplate (100), the designation of (604) the power cap may include reading a designation of a power cap with an RFID reader from an RFID tag integrated in the nameplate, reading a designation of a power cap with a bar code reader from a bar code integrated in the nameplate, reading through wireless data communications with the nameplate a value of the power cap stored in memory in the name plate or any other way of reading (610), by a management module (202) for a data center from the nameplate (100), the designation of (604) the power cap. Reading (610), by a management module (202) for a data center from the nameplate (100), the designation of (604) the power cap allows for management of data center resources based upon the actual power cap value for the computer. Such power cap values reflect actual power usage of the computer more accurately than nameplate ratings that indicate maximum potential power consumption which may never be realized.

Figure 7:
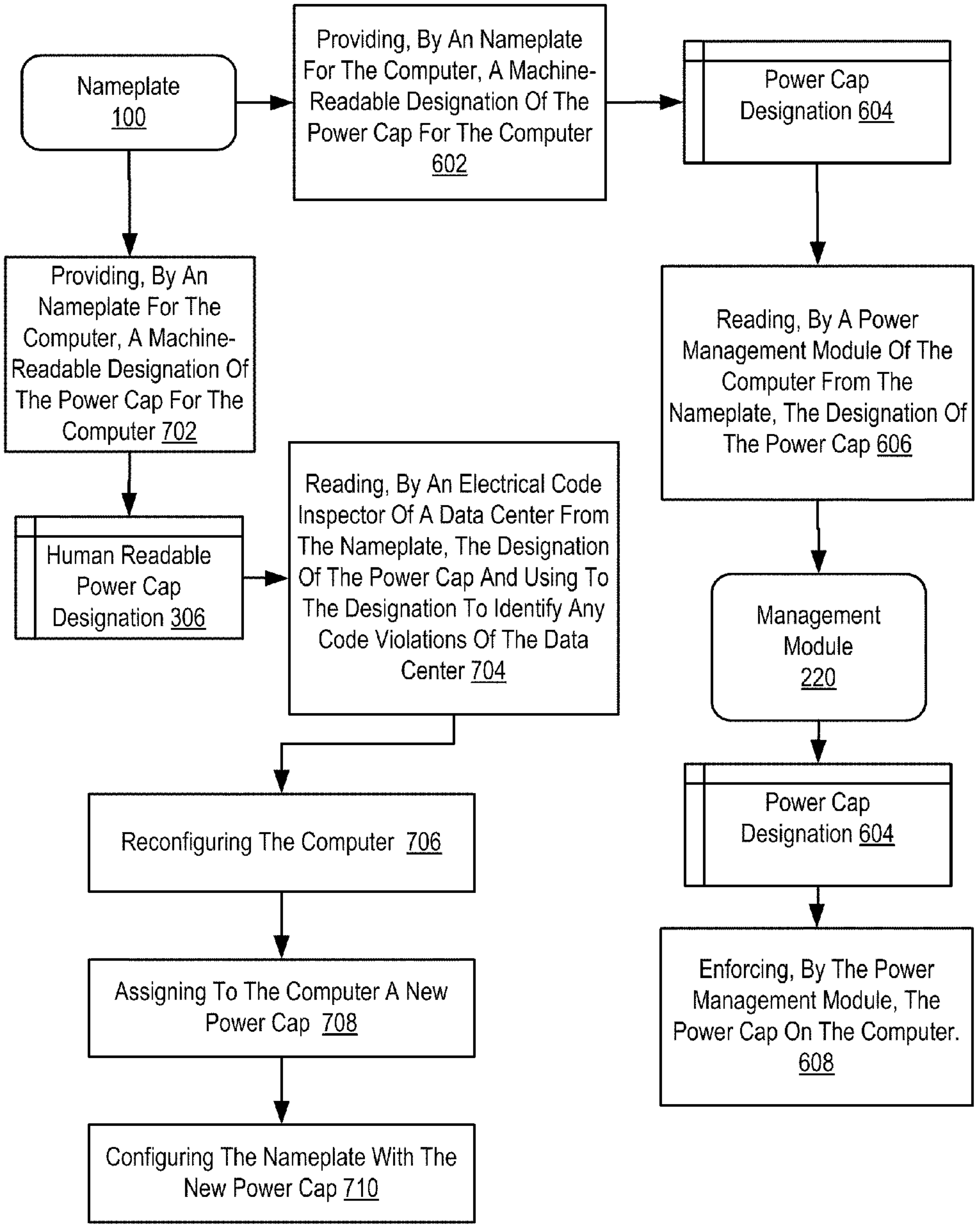
FIG. 7 sets forth a flow chart illustrating another exemplary method of nameplate power capping according to additional embodiments of the present invention.

For further explanation, FIG. 7 sets forth a flow chart illustrating another exemplary method of nameplate power capping according to additional embodiments of the present invention. The method of FIG. 7 is similar to the method of FIG. 6 in that the method of FIG. 7 includes providing (602), by a nameplate (100) for the computer, a machine-readable designation (604) of the power cap for the computer; reading (606), by a power management module (220) of the computer from the nameplate (100), the designation (604) of the power cap; and enforcing (608), by the power management module (220), the power cap on the computer.

The method of FIG. 7 also includes providing (702), by the nameplate (100) for the computer, a human-readable designation (306) of the power cap for the computer. Providing (702), by the nameplate (100) for the computer, a human-readable designation (306) of the power cap for the computer may include proving a printed value of the power cap on the nameplate, providing an engraved value of the power cap in the name plate or any other way of providing a human-readable designation (306) of the power cap that will occur to those of skill in the art.

The method of FIG. 7 also includes reading (704), by an electrical code inspector of a data center from the nameplate (100), the designation of the power cap and using to the designation to identify any code violations of the data center. As indicated above, the power cap value provides an inspector with a more accurate value of actual power consumption of the computer than a nameplate rating.

The method of FIG. 7 also includes reconfiguring (706) the computer. Reconfiguring (706) the computer according to the method of FIG. 7 includes making configuration changes to the computer which affects the power consumption of the computer. Reconfiguring (706) the computer according to the method of FIG. 7 may include adding additional hardware to the computer, changing the hardware configuration of the computer, adding or modifying software on the computer, changing or modifying tasks performed by the computer or any other reconfiguring of the computer that will occur to those of skill in the art.

The method of FIG. 7 includes assigning (708) to the computer a new power cap. Assigning (708) to the computer a new power cap according to the method of FIG. 7 typically includes calculating a new power consumption value for the computer and establishing a power cap that adequately provides enough power to the computer to accomplish the tasks assigned to the computer. Such a new power cap is also typically less than the nameplate rating of the computer but may be more than the previous value of the power cap to reflect an increase or decrease in power demanded by the reconfigured computer. Certain regulatory agencies may require special training or certification by personnel who are permitted to change nameplate power caps to assure that the new nameplate accurately states the power capped maximum power draw on the computer and to assure that the wiring of the computer is adequate for the value on the new nameplate.

The method of FIG. 7 includes configuring (710) the nameplate with the new power cap. Configuring (710) the nameplate with the new power cap may include modifying an RFID tag in the nameplate, adding a new RFID tag in the nameplate, replacing a bar code on the nameplate, modifying values of power caps in memory on the nameplate, removing the nameplate and replacing it with a new one bearing an updated power cap in both human readable and computer readable form, or any other way of configuring (710) the nameplate with the new power cap that will occur to those of skill in the art.

Exemplary embodiments of the present invention are described largely in the context of a fully functional computer system for nameplate power capping. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of nameplate power capping, the method comprising:

providing, by a nameplate for the computer, a machine-readable designation of the power cap for the computer, wherein the nameplate includes a module integrated in a mounting surface for providing a machine-readable designation of power cap for the computer and human readable designation of a power cap for the computer integrated in the mounting surface;

reading, by a power management module of the computer from the nameplate, the designation of the power cap; and enforcing, by the power management module, the power cap on the computer.

2. The method of claim 1 further comprising reading, by a management module for a data center from the nameplate, the designation of the power cap and using the power cap in a power budget for the data center.

3. The method of claim 1 further comprising providing, by the nameplate for the computer, a human-readable designation of the power cap for the computer.

4. The method of claim 1 further comprising reading, by an electrical code inspector of a data center from the nameplate, the designation of the power cap and using the designation to identify any code violations of the data center.

5. The method of claim 1 further comprising: reconfiguring the computer; and assigning to the computer a new power cap; and configuring the nameplate with the new power cap.

6. The method of claim 1 wherein providing, by the nameplate for the computer, a machine-readable designation of the power cap for the computer includes providing a power cap value with an RFID tag.

7. The method of claim 1 wherein providing, by the nameplate for the computer, a machine-readable designation of the power cap for the computer includes providing a power cap value with a bar code.

8. A system for power capping a computer comprising:

a nameplate comprising:

a mounting surface;

a module integrated in the mounting surface for providing a machine-readable designation of a power cap for a particular computer;

a human readable designation of a power cap for the particular computer integrated in the mounting surface;

a mount for attaching the mounting surface to a chassis of the particular computer such that the human readable designation of a power cap is exposed;

a power management module for reading the nameplate designating the power cap; and the power management module enforcing the power cap on the computer.

9. The system of claim 7 wherein the module integrated in the mounting surface comprises computer memory having disposed within it the designation of the power cap and an interface for providing data communications between the computer memory and a computer upon which the nameplate is mounted.

10. The system of claim 8 wherein the interface is an interface for wireless communications with the computer upon which the nameplate is mounted.

11. The system of claim 7 wherein the module integrated in the mounting surface comprises an RFID tag.

12. The system of claim 7 wherein the module integrated in the mounting surface comprises a bar code.

13. The system of claim 7 wherein a human readable designation of a power cap for the particular computer is printed on the mounting surface.

14. The system of claim 7 wherein a human readable designation of a power cap for the particular computer is engraved in the mounting surface.

15. The system of claim 7 wherein the mount for attaching the mounting surface to the particular computer further comprises adhesive.

16. The system of claim 7 wherein the mount for attaching the mounting surface to the particular computer further comprises one or more screws.

17. A computer program product for nameplate power capping, the computer program product disposed upon a recordable medium device, the computer program product comprising computer program instructions for:

reading, by a power management module, the designation of the power cap, wherein the nameplate includes a module integrated in a mounting surface for providing a machine-readable designation of power cap for the computer and human readable designation of a power cap for the computer integrated in the mounting surface; and enforcing, by the power management module, the power cap on the computer.

18. The computer program product of claim 17 wherein reading, from the nameplate of a computer, the designation of the power cap further comprises reading the designation of the power cap from an RFID tag.

19. The computer program product of claim 17 wherein reading, from the nameplate of a computer, the designation of the power cap further comprises reading the designation of the power cap from a bar code.

* * * * *